(12) United States Patent
Hart (10) Patent No.: US 10,935,993 B2
(45) Date of Patent: Mar. 2, 2021

(54) FLOW RATE CONTROLLER

(71) Applicant: Neoperl GmbH, Mullheim (DE)

(72) Inventor: Keith Hart, Worcestershire (GB)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 16/479,466

(22) PCT Filed: Jan. 31, 2018

(86) PCT No.: PCT/EP2018/052326
§ 371 (c)(1),
(2) Date: Jul. 19, 2019

(87) PCT Pub. No.: WO2018/158023
PCT Pub. Date: Sep. 7, 2018

(65) Prior Publication Data
US 2019/0391601 A1 Dec. 26, 2019

(30) Foreign Application Priority Data
Mar. 3, 2017 (DE) .......................... 202017101236.0

(51) Int. Cl.
| G05D 7/00 | (2006.01) |
|---|---|
| G05D 7/01 | (2006.01) |
| G05D 16/06 | (2006.01) |
| F15D 1/02 | (2006.01) |

(52) U.S. Cl.
CPC ........... G05D 7/0106 (2013.01); G05D 16/06 (2013.01); F15D 1/02 (2013.01)

(58) Field of Classification Search
CPC ......... G05D 7/012; F16K 1/465; F16K 47/08; F16K 15/14; F16K 1/36; F16K 17/34; Y10S 251/90; Y10T 137/7869; Y10T 137/7857; Y10T 137/7792; Y10T 137/7896; Y10T 137/7861
USPC ..................... 138/46, 43, 45; 137/515.7, 517
See application file for complete search history.

(56) References Cited

U.S. PATENT DOCUMENTS

| 3,847,178 | A | * | 11/1974 | Keppel | .................... | F16K 1/465 |
|---|---|---|---|---|---|---|
| | | | | | | 137/515.7 |
| 4,000,857 | A | * | 1/1977 | Moen | .................... | C02F 3/1294 |
| | | | | | | 239/428.5 |
| 6,311,712 | B1 | * | 11/2001 | Meyer | .................. | G05D 7/0146 |
| | | | | | | 137/271 |
| 6,571,831 | B1 | * | 6/2003 | Hart | ........................ | G05D 7/012 |
| | | | | | | 138/45 |
| 6,695,011 | B2 | * | 2/2004 | Sochtig | .................. | G05D 7/012 |
| | | | | | | 137/516.15 |

(Continued)

FOREIGN PATENT DOCUMENTS

| DE | 102009057559 | 4/2011 |
|---|---|---|
| EP | 0115342 | 8/1984 |

(Continued)

*Primary Examiner* — Patrick F Brinson
(74) *Attorney, Agent, or Firm* — Volpe Koenig (57) ABSTRACT

In a flow regulator (1) having a regulating body (3) and a regulating profile (8), which therebetween configure a regulating gap (11), the available width or opening cross section of said regulating gap (11) being variable by pressure, it is provided that regulating protrusions (9) are disposed such that neighboring regulating protrusions (9) therebetween enclose dissimilar spacings (10, 13).

9 Claims, 5 Drawing Sheets

(56) References Cited

U.S. PATENT DOCUMENTS

| | | | |
|---|---|---|---|
| 7,527,075 B2* | 5/2009 | Zoller | G05D 7/012 |
| | | | 137/493 |
| 7,594,519 B2* | 9/2009 | Hart | G05D 7/012 |
| | | | 138/43 |
| 9,377,128 B2* | 6/2016 | Twitchett | B05B 12/088 |
| 10,013,000 B2* | 7/2018 | Twitchett | B05B 1/3006 |
| 10,337,658 B2* | 7/2019 | Sochtig | F16L 55/11 |
| 2014/0014216 A1 | 1/2014 | Tsai et al. | |
| 2014/0110005 A1* | 4/2014 | Ho | G05D 7/012 |
| | | | 138/43 |
| 2015/0129684 A1 | 5/2015 | Hart | |
| 2017/0218609 A1* | 8/2017 | Lin | G05D 7/012 |
| 2018/0036748 A1* | 2/2018 | Twitchett | B05B 1/3006 |

FOREIGN PATENT DOCUMENTS

| | | |
|---|---|---|
| EP | 2226697 | 9/2010 |
| WO | 2006094581 | 9/2006 |

* cited by examiner

FLOW RATE CONTROLLER

BACKGROUND

The invention relates to a flow regulator having a deformable, preferably annular, regulating body which is placed in a corresponding groove, wherein a regulating profile is configured on at least one groove lateral wall, wherein the regulating profile is formed from a sequence of regulating protrusions and regulating clearances, and the regulating body and the regulating profile therebetween delimit a regulating gap in such a manner that a shape variation of the regulating body causes a variation in the size of the regulating gap, wherein neighboring regulating protrusions are disposed at a mutual spacing such that a sequence of spacings is formed in each case between neighboring regulating protrusions along the circumference.

U.S. Pat. No. 3,847,178 A relates to a flow regulator having a deformable regulating body which is placed in a groove, wherein a regulating profile is configured on a groove lateral wall. The regulating profile is assembled from a sequence of regulating protrusions which are disposed at regular mutual spacings.

EP 2 226 697 A1 relates to a flow regulator having an annular throttle body from an elastic material, said throttle body between itself and a regulating star delimiting a control gap which is variable under the pressure of the fluid streaming therethrough.

US 2015/129648 A1 relates to a flow regulator which has an elongate shape. The regulating body of the flow regulator thus likewise has an elongate shape, wherein said regulating body is placed in a corresponding groove which has the regulating protrusions which are disposed at identical mutual spacings. Only the shape per se of the regulating protrusions varies herein.

SUMMARY

In order for the object mentioned to be achieved, one or more features are provided according to the invention. In particular, in a flow regulator of the type described at the outset it is thus proposed according to the invention in order for the object mentioned to be achieved that at least two spacings in the sequence of spacings are chosen so as to be mutually dissimilar in size. A regulating behavior in different pressure ranges is thus separately adjustable. The invention has recognized a region or part of the regulating body which spans a comparatively large spacing between neighboring regulating protrusions substantially determines the regulating behavior, thus the dependence of the flow regulator on the pressure in the case of small pressure differentials across the flow regulator. This can be explained in that a part or a region of the regulating body which is supported on widely spaced apart locations is already deformed by comparatively minor pressures. By contrast, a part or a region of the regulating body which spans a comparatively tight or small spacing between neighboring regulating protrusions and thus is supported on regulating protrusions that lie close together is deformable only at high pressures. Such a part or region thus substantially defines the regulating behavior at high pressures. Regulating curves which from low pressures ascend comparatively rapidly to a plateau or to a desired value of the throughflow are thus achievable so that an operating range in which, for example, a desired flow rate per time unit is implemented independently of pressure.

The regulating body is preferably configured as an O-ring.

In one design embodiment of the invention it can be provided that the regulating protrusions in the circumferential direction are non-uniformly distributed. A regulating behavior in a finely sub-divided pressure range is thus capable of being designed depending on the requirement.

In one design embodiment of the invention it can be provided that one spacing of the at least two spacings in terms of size is more than double that of another spacing of the at least two spacings. A regulating behavior in pressure ranges that lie varied remote from one another is thus capable of being established. The spacing in terms of size is preferably at least more than three or four times that of the other spacing. A particularly widely spread operating range for the regulating behavior is thus capable of being formed.

In one design embodiment of the invention it can be provided that the regulating protrusions have a uniform height by way of which said regulating protrusions protrude in each case from the at least one groove lateral wall into the regulating gap. A desired regulating behavior is thus capable of being defined in a readily reproducible manner.

In one design embodiment of the invention it can be provided that the regulating protrusions are oriented in a radially outward manner. The regulating gap is thus capable of being configured so as to be radially inside on the regulating body.

The terms "radial", "axial", "circumferential direction" herein and hereunder can be defined, for example, in relation to a longitudinal axis or longitudinal direction and/or in relation to a round shape, for example of the regulating body or the flow regulator.

Alternatively or additionally, it can be provided in one design embodiment of the invention that the regulating protrusions are disposed so as to be radially within the regulating body. The regulating body thus surrounds the regulating protrusions on the external side, said regulating protrusions being configured on a regulating core, for example. The regulating core herein can be disposed to as to be centric.

In one design embodiment of the invention it can be provided that the regulating protrusions are disposed so as to be oriented in a radially inward manner. The regulating gap is thus capable of being configured radially outside on the regulating body.

Alternatively or additionally, it can be provided in one design embodiment of the invention that the regulating protrusions are disposed radially outside the regulating body. An annular regulating core or an annular regulating profile is thus usable.

It can also be provided that one part of the regulating protrusions is oriented in a radially outward manner, and a further part of the regulating protrusions is oriented in a radially inward manner. Two regulating gaps which are disposed radially within, or radially outside, respectively, the regulating body are thus capable of being formed.

In one design embodiment of the invention it can be provided that at least two regulating protrusions in the circumferential direction have dissimilar widths. A bearing region by way of which the regulating body lies on the regulating protrusion is thus individually selectable so as to be able to achieve a desired regulating behavior.

In one design embodiment of the invention it can be provided that a height, for example the height already mentioned, by way of which the regulating protrusions protrude from the at least one groove lateral wall into the regulating gap is adjustable at least for part of the regulating protrusions. A regulating behavior is thus also capable of being retroactively varied, for example so as to set and/or vary a desired plateau. For example, the height is individually adjustable for all regulating protrusions. This enables a particularly finely graded setting of a shape of the regulating curve. Alternatively, it can be provided that the regulating protrusions are adjustable in groups or collectively. This enables a particularly simple adjustability, for example for establishing a plateau of the regulating curve. It can be provided herein that the adjustability relates to the height of the regulating profiles and/or to the mutual spacing of said regulating profiles. A coupling for varying the regulating profile simultaneously in terms of height and spacing can also be provided. This can be specified, for example, by configuring a regulating profile on an adjustable cone or a similar tapered part.

In one design embodiment of the invention it can be provided that at least one regulating protrusion forms an intermediate protrusion which in terms of the height thereof is reduced in relation to a height of the neighboring regulating protrusions, for example in relation to the height already mentioned. It has been demonstrated that comparatively small intermediate protrusions contribute to a noise reduction in operation, preferably without any substantial change in the regulating behavior, particularly where a large spacing exists between neighboring regulating protrusions. The use of comparatively wide intermediate protrusions increases the variability when defining a desired regulating curve or a desired regulating behavior.

The intermediate protrusions are preferably configured so as to be fixed and non-adjustable.

BRIEF DESCRIPTION OF THE DRAWINGS

The invention now will be described in more detail using exemplary embodiments but is not limited to these exemplary embodiments. Further exemplary embodiments are derived by combining the features of individual claims or a plurality of claims with one another and/or with individual features or a plurality of features of the exemplary embodiments.

In the figures.

DETAILED DESCRIPTION

Figure 1:
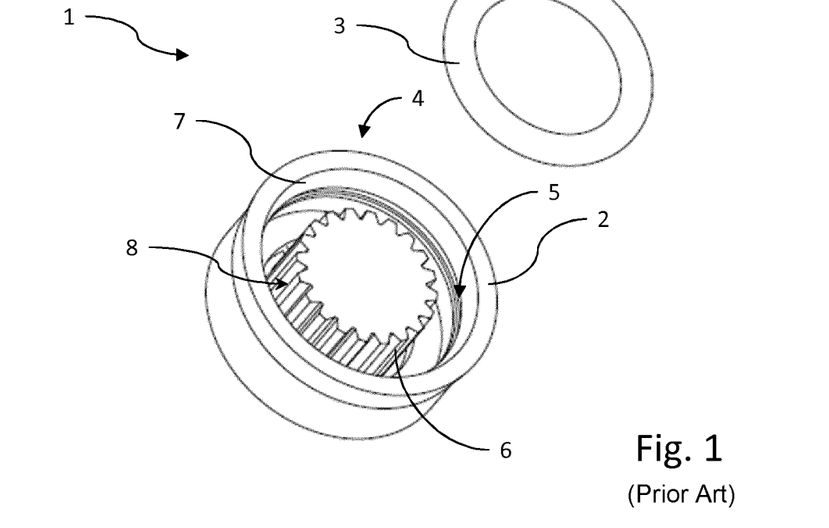
FIG. 1 shows a flow regulator according to the prior art in an exploded illustration.
Figure 2:
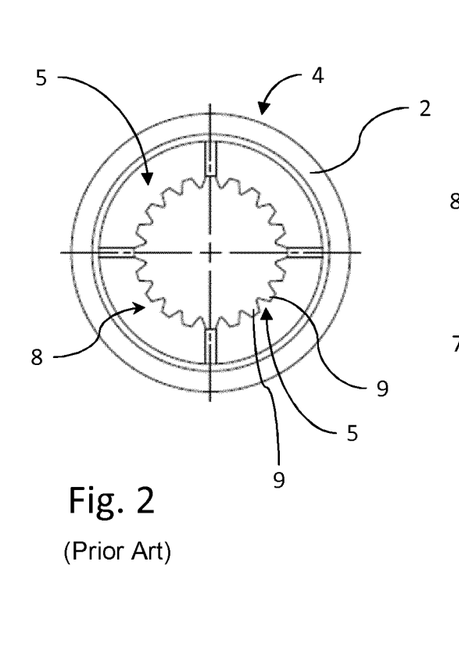
FIG. 2 shows a view onto the inflow side of the flow regulator as per FIG. 1, wherein the regulating body is removed.
Figure 3:
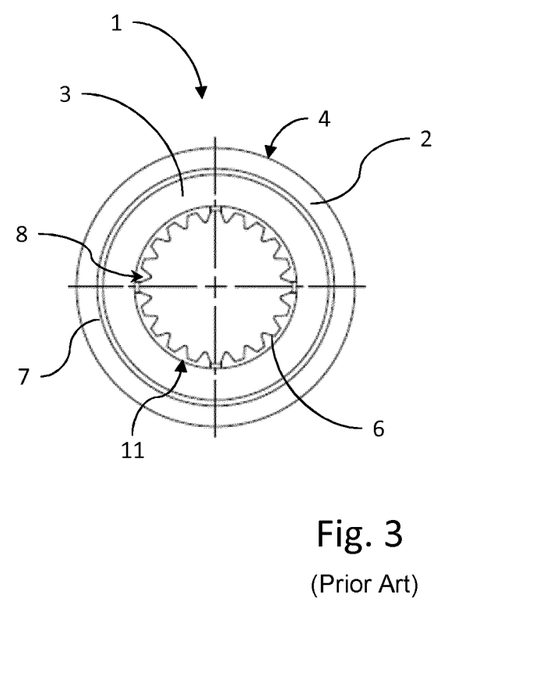
FIG. 3 shows the view according to FIG. 2 with the inserted regulating body.

FIGS. 1 to 3 show different views of a flow regulator according to the prior art, which in its entirety is identified by the reference sign 1. The flow regulator 1 is configured for inserting into a fitting outlet or a pipe portion or the like.

The flow regulator 1 has a housing 2 into which a regulating body 3 is insertable from an inflow side 4.

To this end, the housing 2 forms an annular groove 5 which is open toward the inflow side 4 and which receives the annular regulating body 3.

The groove 5 in a radially inward and radially outward manner is in each case delimited by a groove lateral wall 6, 7.

A regulating profile 8 is configured on the radially inward groove lateral wall 6.

The regulating profile 8 forms a sequence 12 of regulating protrusions 9 which from the groove lateral wall 6 protrude in a radially outward manner into the groove 5. The regulating protrusions 9 are all of identical configuration. The spacings 10 between neighboring regulating protrusions 9 are chosen so as to be identical such that the regulating protrusions 9 are uniformly distributed along a circumference.

A regulating gap 11 is formed in the operation between the regulating body 3 and the regulating profile 8. The cross section of the regulating body 3 is deformed depending on the pressure prevailing on the inflow side 4, such that the regulating gap 11 is constricted in a pressure-dependent manner. The regulating protrusions 9 herein form bearing points for the regulating body 3, the shape variation of the regulating body 3 substantially taking place between said bearing points. The regions of the regulating body 3 between two neighboring regulating protrusions 9 are thus disposed so as to be mutually parallel. Each of said regions functions in an identical manner. The regulating body 3 is made from an elastic material, for example from rubber.

Figure 4:
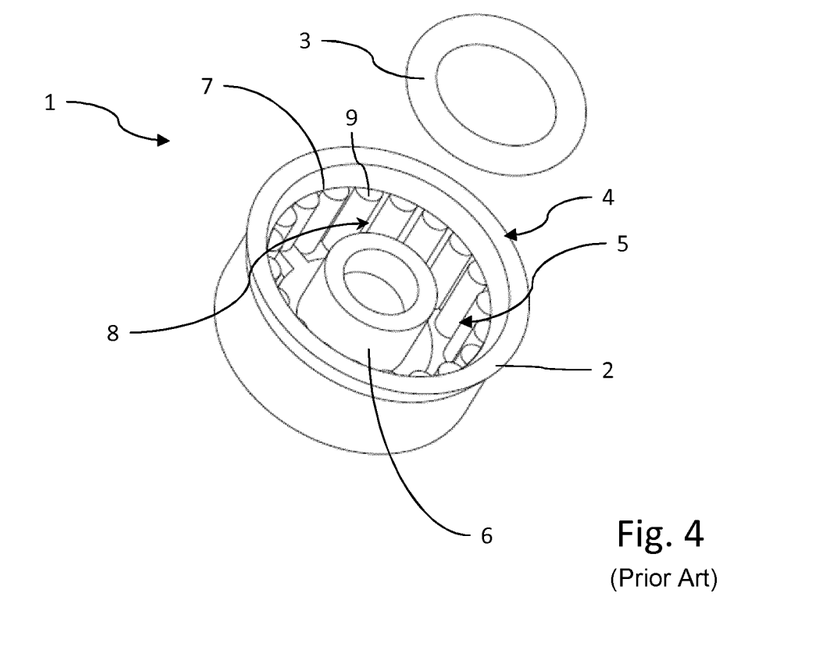
FIG. 4 shows a further flow regulator according to the prior art in an exploded illustration.
Figure 5:
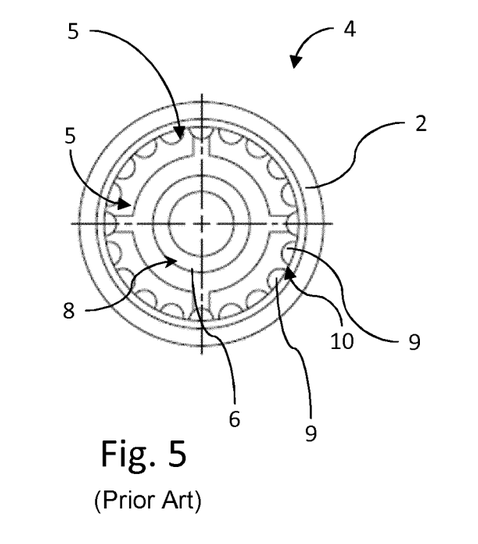
FIG. 5 shows a view onto the inflow side of the flow regulator as per FIG. 4, wherein the regulating body is removed.
Figure 6:
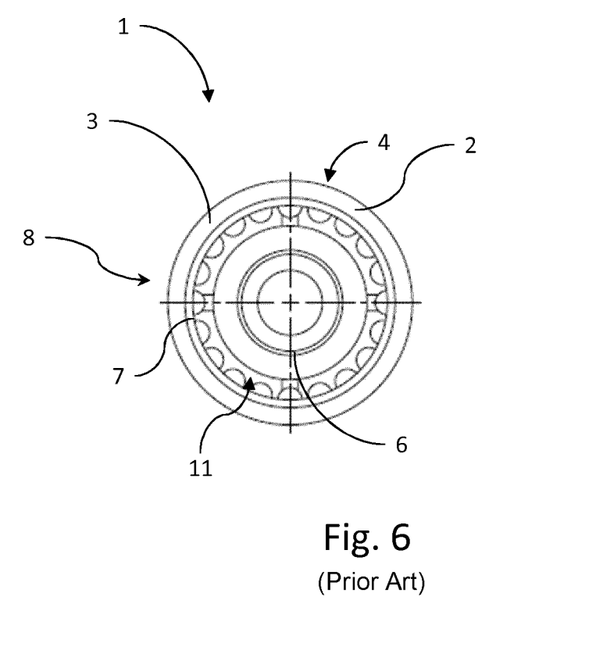
FIG. 6 shows the view according to FIG. 5 with the inserted regulating body.

FIGS. 4 to 6 show different views of a further flow regulator 1 according to the prior art and are collectively described. Components and functional units which in terms of function and/or construction are equivalent or identical to the preceding flow regulator according to FIGS. 1 to 3 are provided with the same reference signs and are not described separately. Rather, the explanations pertaining to FIGS. 1 to 3 apply in analogous manner to FIGS. 4 to 6.

By contrast to the variant as per FIGS. 1 to 3, the regulating profile 8 in the flow regulator 1 as per FIGS. 4 to 6 is configured on the external groove lateral wall 7 such that the regulating protrusions 9 protrude in a radially inward manner.

The regulating gap 11 is thus configured so as to be radially outside the regulating body 3 and surrounds the latter along the circumference.

Figure 7:
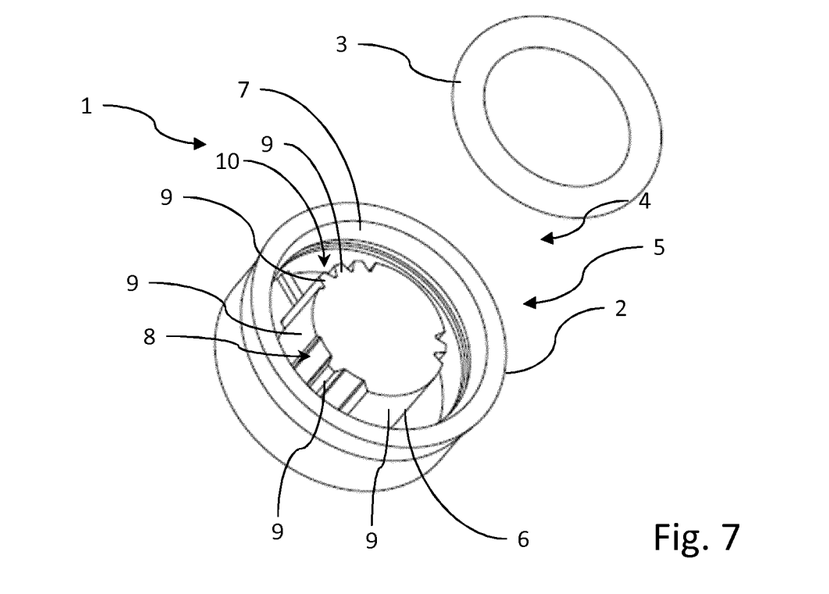
FIG. 7 shows a flow regulator according to the invention in an exploded illustration.
Figure 8:
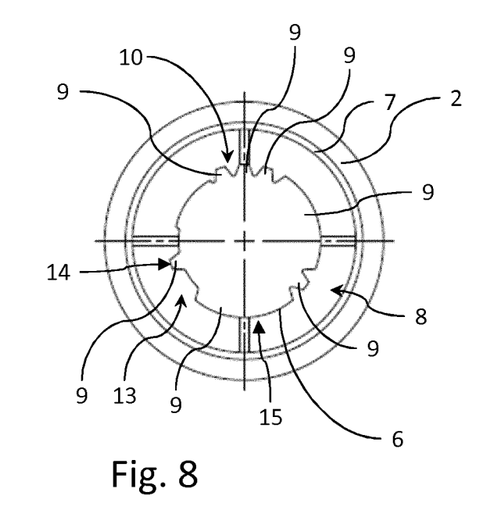
FIG. 8 shows a view onto the inflow side of the flow regulator as per FIG. 7, wherein the regulating body is removed.
Figure 9:
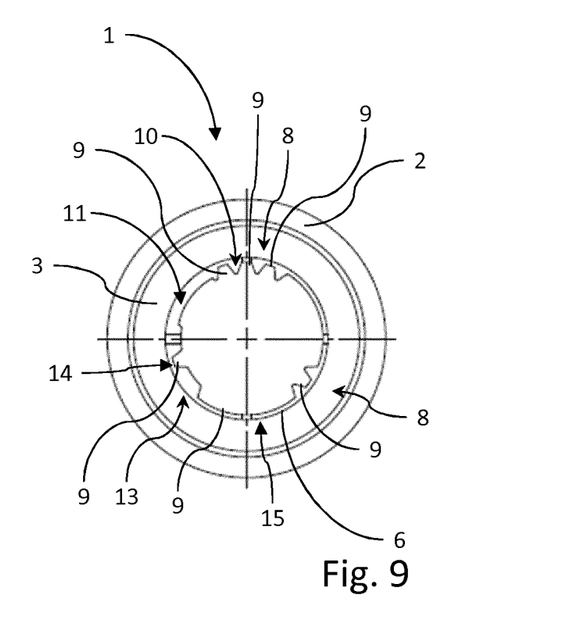
FIG. 9 shows the view according to FIG. 8 with the inserted regulating body.

FIGS. 7 to 9 show different views of a flow regulator 1 according to the invention and are collectively described. Components and functional units which in terms of function and/or construction are equivalent or identical to the preceding flow regulator according to FIGS. 1 to 6 are identified by the same reference signs and are not separately described. Rather, the explanations pertaining to FIGS. 1 to 6 apply in analogous manner to FIGS. 7 to 9.

The exemplary embodiment according to the invention as per FIGS. 7 to 9 differs from the prior art as per FIGS. 1 to 6 in that the sequence 12 of spacings 10, 13 has at least two spacings 10, 13 which are dimensioned in a mutually different manner.

The spacing 13 between two neighboring regulating protrusions 9 is thus larger than the spacing 10. The regulating body 3 in the region of the spacing 13 therefore sets the regulating behavior at low pressures, whereas the regulating behavior at high pressures is set in the region of the spacing 10.

Overall, the regulating profile 8 along the circumferential direction, thus along the profile of the groove 5 here, shows a non-uniform distribution of regulating protrusions.

The spacing 13 herein is a multiple of the spacing 10.

The regulating protrusions 9 herein have a uniform height across the (imaginary, cylinder-sleeve-shaped) groove lateral wall 6 and protrude in a radially outward manner such that the regulating gap 11 is configured radially within the regulating body 3.

The regulating gap 11 herein forms an axially oriented passage opening for water.

It can be clearly seen from FIG. 8 that the regulating protrusions 9 are configured by way of dissimilar contours and have dissimilar widths 14, 15.

Figure 10:
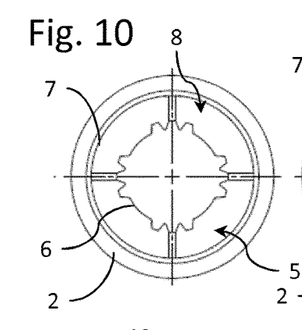
FIG. 10 shows a further flow regulator according to the invention, wherein the regulating body is removed.
Figures 11, 13:
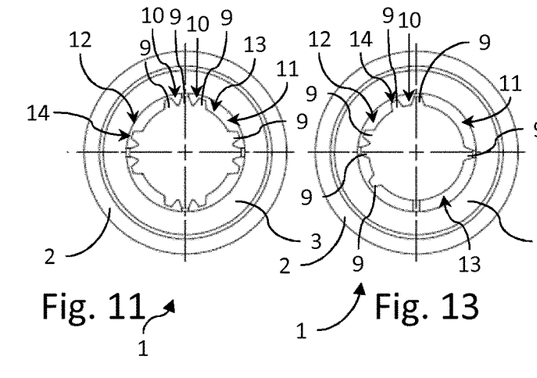
FIG. 11 shows the flow regulator according to FIG. 10 with the inserted regulating body.
FIG. 13 shows the flow regulator according to FIG. 12 with the inserted regulating body.
Figure 12:
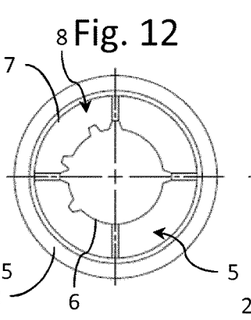
FIG. 12 shows a further flow regulator according to the invention, wherein the regulating body is removed.
Figure 14:
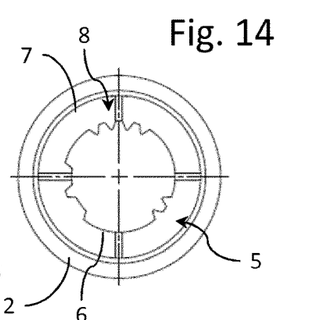
FIG. 14 shows a further flow regulator according to the invention, wherein the regulating body is removed.
Figure 15:
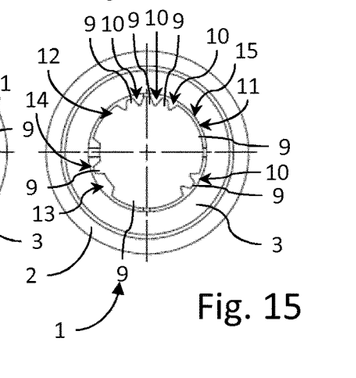
FIG. 15 shows the flow regulator according to FIG. 14 with the inserted regulating body.
Figures 16, 17, 18, 19, 20, 21:
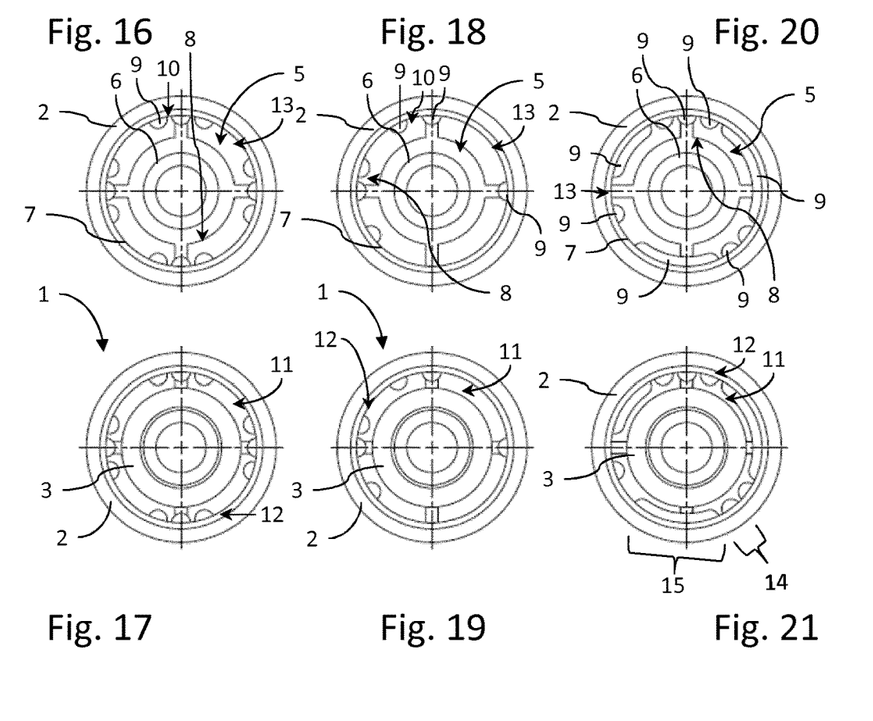
FIG. 16 shows a further flow regulator according to the invention, wherein the regulating body is removed.
FIG. 17 shows the flow regulator according to FIG. 16 with the inserted regulating body.
FIG. 18 shows a further flow regulator according to the invention, wherein the regulating body is removed.
FIG. 19 shows the flow regulator according to FIG. 18 with the inserted regulating body.
FIG. 20 shows a further flow regulator according to the invention, wherein the regulating body is removed.
FIG. 21 shows the flow regulator according to FIG. 20 with the inserted regulating body.

FIGS. 10 and 11 show different views of a flow regulator 1 according to the invention and are collectively described. Components and functional units which in terms of function and/or construction are equivalent or identical to the preceding flow regulator according to FIGS. 1 to 9 are identified by the same reference signs and are not separately described. Rather, the explanations pertaining to FIGS. 1 to 9 apply in analogous manner to FIGS. 10 and 11.

The exemplary embodiment as per FIGS. 10 and 11 differs from the exemplary embodiment as per FIGS. 7 to 9 in that the regulating protrusions 9 are indeed disposed by way of dissimilar spacings 10 and 13 but by way of a quartic rotational symmetry. A non-uniform but regular arrangement of regulating protrusions 9 thus results.

The spacing 13 is at least four times the spacing 10.

FIGS. 12 to 15 show further variants of regulating profiles 8 on the internal groove lateral wall 6. The explanations pertaining to FIGS. 1 to 11 are also to be read in the context of said FIGS. 12 to 15. To this end, the reference signs have been used in an identical manner. The regulating profiles 8 differ in terms of the number, the arrangement, and the size, in particular the width 13, 14, of the regulating profiles 8.

FIGS. 16 to 21 show further variants of regulating profiles 8 on the external groove lateral wall 7. The explanations pertaining to FIGS. 1 to 15 are also to be read in the context of said FIGS. 16 to 21. To this end, the reference signs have been used in identical manner. The regulating profiles 8 here are formed by the regulating protrusions 9 which protrude in a radially inward manner from the external groove lateral wall 7. The regulating gap 11 which is disposed radially outside the regulating body 3 and encloses the latter in an annular manner is configured between the regulating profiles 8 and the regulating body 3.

The regulating profiles 8 of FIGS. 16 to 21 differ in terms of the number, the arrangement, and the size, in particular the width 13, 14, of the regulating profiles 8.

Figure 22:
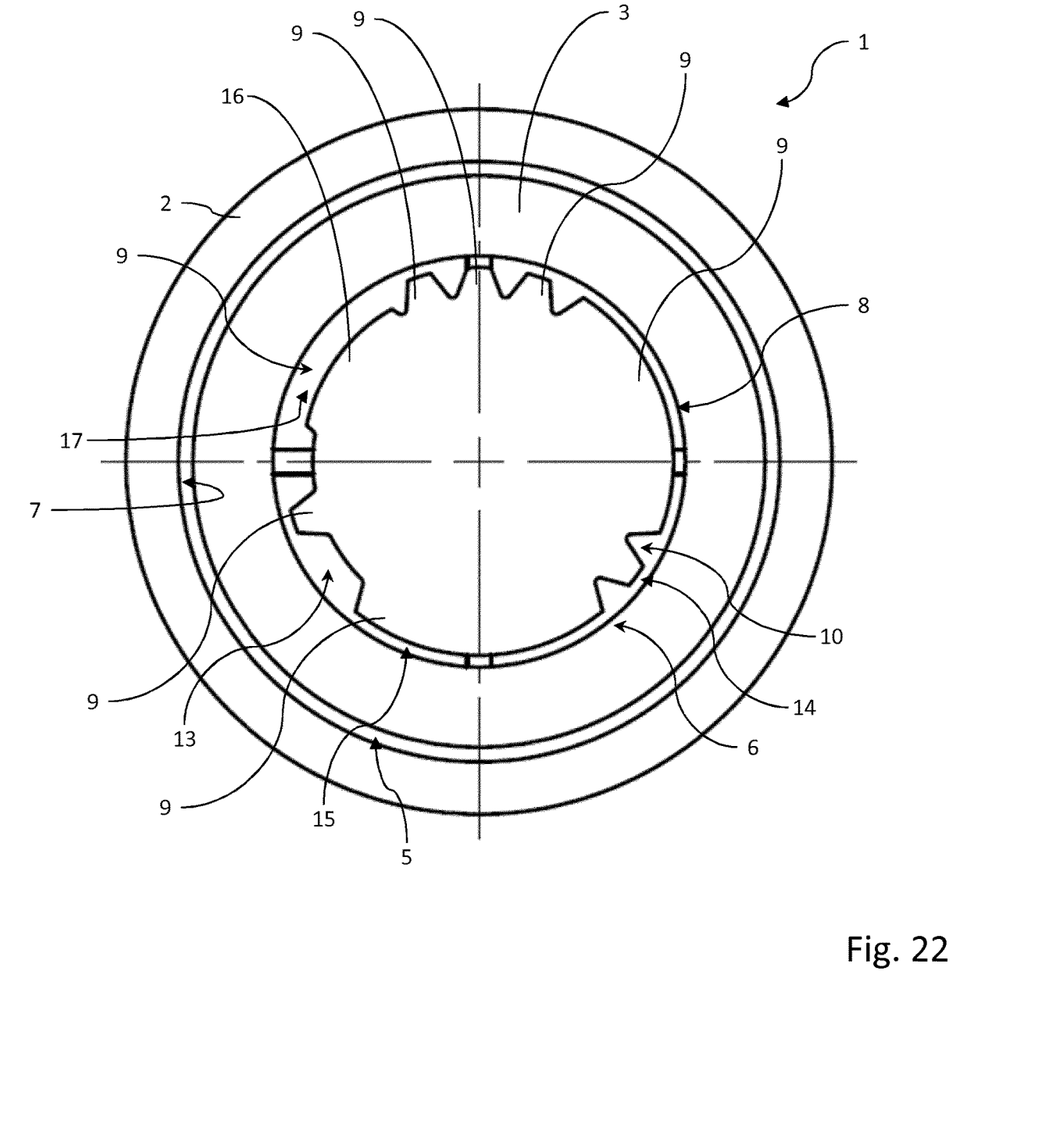
FIG. 22 shows a further flow regulator according to the invention having dissimilar heights of the regulating protrusions.

FIG. 22 in an exemplary manner shows a further flow regulator 1 according to the invention, having a regulating profile 8. The explanations pertaining to FIGS. 1 to 21 are also to be read in the context of said FIG. 22. To this end, the reference signs have been used in an identical manner.

The regulating profile 8 differs from the regulating profiles described above in that a regulating protrusion 9 is configured as an intermediate protrusion 16. To this end, a recess 17 which causes a smaller height of the regulating protrusion 9 is configured on the regulating protrusion 9.

This recess 17 can be configured on each of the regulating protrusions 9 in the exemplary embodiments shown, depending on the desired regulating behavior. Intermediate protrusions 16 of this type can serve as a support port of the deformed regulating body 3, for example, so as to develop, after an initially slight deformation (thus at comparatively low pressures), a higher resistance counter to any further deformation. A different contribution toward the regulating behavior at low and high pressures thus results.

In further exemplary embodiments recesses of dissimilar sizes are configured such that a plurality of steps of dissimilarly high regulating protrusions is configured.

The enumeration of the variants shown is not to be understood to be complete; rather, further variants are derived by combining and/or varying the variants shown, in particular in terms of the number, the width, the height, the shape, and/or the height of the regulating protrusions. For example, regulating profiles 8 that are configured radially within the regulating body 3 are also capable of being combined with regulating profiles 8 that are configured radially outside the regulating body 3. Two regulating gaps 11 which can lie inside one another or beside one another are thus configurable.

Other shapes of the regulating body 3 and/or of the groove 5, for example linear, triangular, rectangular, oval, zigzag-shaped, undulated, or other profiles are implemented in further exemplary embodiments. Cross-sectional shapes, for example flat, triangular, oval, polygonal cross-sectional shapes, deviating from the embodiment of the regulating body 3 as an O-ring here, are also implemented.

In a flow regulator 1 having a regulating body 3 and a regulating profile 8, which therebetween configure a regulating gap 11, the available width or opening cross section of said regulating gap 11 being variable by pressure, it is provided that regulating protrusions 9 are disposed such that neighboring regulating protrusions 9 therebetween enclose dissimilar spacings 10, 13.

LIST OF REFERENCE SINGS

1 Flow regulator
2 Housing
3 Regulating body
4 Inflow side
5 Groove
6 Groove lateral wall
7 Groove lateral wall 8 Regulating profile
9 Regulating protrusion
10 Spacing
11 Regulating gap
12 Sequence
13 Spacing
14 Width
15 Width
16 Intermediate protrusion
17 Recess

The invention claimed is:

1. A flow regulator (1), comprising:
a housing having a groove;
a deformable regulating body (3) which is placed in the groove (5);
the groove being defined by at least one groove lateral wall (6, 7), and a regulating profile (8) is configured on the at least one groove lateral wall (6, 7);
the regulating profile (8) is formed from a sequence (12) of regulating protrusions (9) and regulating clearances;
the regulating body (3) and the regulating profile (8) therebetween delimit a regulating gap (11) in which a shape variation of the regulating body (3) causes a variation in a size of the regulating gap (11);
neighboring ones of the regulating protrusions (9) are disposed at a mutual spacing (10, 13) such that a sequence (12) of spacings (10, 13) is formed in each case between neighboring regulating protrusions (9) along a circumference; and
at least of the two spacings (10, 13) in the sequence (12) of spacings (10, 13) are chosen so as to be mutually dissimilar in size, and one said spacing (10, 13) of the at least two spacings (10, 13) in terms of size is at least double that of another said spacing (10, 13) of the at least two spacings (10, 13).

2. The flow regulator (1) as claimed in claim 1, wherein the regulating protrusions (9) are non-uniformly distributed in the circumferential direction.

3. The flow regulator (1) as claimed in claim 1, wherein one said spacing (10, 13) of the at least two spacings (10, 13) in terms of size is more than three times that of another said spacing (10, 13) of the at least two spacings (10, 13).

4. The flow regulator (1) as claimed in claim 1, wherein the regulating protrusions (9) have a uniform height by which said regulating protrusions (9) protrude in each case from the at least one groove lateral wall (6, 7) into the regulating gap (11).

5. The flow regulator (1) as claimed in claim 1, wherein the regulating protrusions (9) are oriented at least one of in a radially outward manner or radially within the regulating body (3).

6. The flow regulator (1) as claimed in claim 1, wherein the regulating protrusions (9) are oriented at least one of in a radially inward manner or radially outside the regulating body (3).

7. The flow regulator (1) as claimed in claim 1, wherein at least two of the regulating protrusions (9) have dissimilar widths in the circumferential direction.

8. The flow regulator (1) as claimed in claim 1, wherein a height that the regulating protrusions (9) protrude from the at least one groove lateral wall (6, 7) into the regulating gap (11) differs from at least some of the regulating protrusions (9).

9. The flow regulator (1) as claimed in claim 8, wherein at least one said regulating protrusion (9) forms an intermediate protrusion (16) which in terms of the height thereof in relation to a height of the neighboring regulating protrusions (9) is reduced by a recess (17).

\* \* \* \* \*